United States Patent [19]
Fawcett

[11] Patent Number: 5,697,051
[45] Date of Patent: *Dec. 9, 1997

[54] METHOD FOR COORDINATING PROPAGATION DELAYS IN A SATELLITE LINKED SIMULCAST NETWORK USING A BENCHMARK STATION

[75] Inventor: Glenn S. Fawcett, Vancouver, Canada

[73] Assignee: Glenayre Electronics, Inc., Charlotte, N.C.

[*] Notice: The term of this patent shall not extend beyond the expiration date of Pat. No. 5,481,258.

[21] Appl. No.: 549,055

[22] Filed: Oct. 27, 1995

Related U.S. Application Data

[63] Continuation of Ser. No. 105,436, Aug. 11, 1993, Pat. No. 5,481,258.

[51] Int. Cl.⁶ .................................................. H04B 7/19
[52] U.S. Cl. .................... 455/13.2; 455/503; 455/67.6; 370/519
[58] Field of Search ...................... 455/12.1, 13.1, 455/13.2, 7, 38.1, 51.1, 51.2, 53.1, 67.1, 67.6, 69, 70, 502, 503; 375/356; 340/825.44, 825.14, 825.47; 370/517, 519

[56] References Cited

U.S. PATENT DOCUMENTS

| | | | |
|---|---|---|---|
| 4,718,109 | 1/1988 | Breeden et al. | 455/51.2 |
| 4,850,032 | 7/1989 | Freeburg | 455/51.2 |
| 5,077,759 | 12/1991 | Nakahara | 375/356 |
| 5,201,061 | 4/1993 | Goldberg et al. | 455/38.1 X |
| 5,257,404 | 10/1993 | Goreham et al. | 455/51.2 |
| 5,261,118 | 11/1993 | Vanderspool | 455/51.2 |
| 5,361,398 | 11/1994 | Christian et al. | 455/51.2 |
| 5,481,258 | 1/1996 | Fawcett et al. | |

*Primary Examiner*—Reinhard J. Eisenzopf
*Assistant Examiner*—Philip J. Sobutka
*Attorney, Agent, or Firm*—Christensen O'Connor Johnson & Kindness PLLC

[57] ABSTRACT

A clock synchronization system for synchronizing a number of paging stations (24) with a system controller (23). Each paging station has a clock that includes a counter (52) that indicates the current local time and which is sequentially incremented by a counter advance signal applied thereto. A voltage controlled oscillator (58) generates the clocking signal that controls the advancement of the counter. A CPU (50) in the system controller monitors the time indicated by the counter and compares it to timing information received from a system clock. The timing information includes a time mark and a time mark send time. The system clock transmits to each paging system the time mark. At a future time, the system clock transmits the time mark send time which is the precise time at which the time mark was transmitted. The paging stations each measure the time interval between the time at which the time mark arrived and the time at which the time mark was transmitted by the system clock period. By subtracting the time at which the time mark was transmitted by the system clock and the propagation time to each paging station, each paging station can determine and correct the error in its clock.

1 Claim, 11 Drawing Sheets

METHOD FOR COORDINATING PROPAGATION DELAYS IN A SATELLITE LINKED SIMULCAST NETWORK USING A BENCHMARK STATION

This is a continuation of the prior application Ser. No. 08/105,436, now U.S. Pat. No. 5,481,258, filed Aug. 11, 1993, the benefit of the filing date of which is hereby claimed under 35 U.S.C. § 120.

FIELD OF THE INVENTION

This invention relates generally to a system for coordinating a plurality of clocks and, more particularly, to a system for coordinating a set of clocks that are spaced apart over a wide geographic area.

BACKGROUND OF THE INVENTION

Many modern communication systems are assembled from a number of smaller subsystems or stations that are geographically spaced apart from each other, but are arranged to work together. One such system is a paging system that typically comprises a paging terminal, a paging system controller, and a number of transmitter units, called paging stations, that are located over a wide geographic paging service area. The paging terminal is connected to the publicly switched telephone network and receives incoming calls to the system subscribers. In response to a call, the paging terminal formulates a page for the subscriber and forwards the page to the paging stations through the paging system controller.

The paging stations, upon receipt of the page, broadcast it over the air with their associated transmitting equipment. The subscriber's pager, which is a small receiver, picks up the broadcasts and, by the actuation of a display, generation of an audio tone, or generation of a tactile vibration, notifies the subscriber that the he is being paged. Other types of multistation systems include cellular two-way systems and data acquisition systems.

To ensure that multistation communications and measuring systems function properly, each station typically includes a clock that must be coordinated with the clocks of the other stations. In other words, each of the clocks must, at the same moment, indicate a time that is related to one another. For example, one paging system is arranged so that the paging system controller collects a number of pages, bundles them together in a packet, and then forwards the packet to the paging stations along with an instruction indicating when the packet should be broadcast. The paging stations then broadcast the packet of pages at the time indicated in the instruction. As long as all the stations broadcast the packet at exactly the same time, pager receivers carded by system subscribers who are in areas where paging signals from two or more stations that are about the same distance from the paging receivers will receive a signal that the pagers' circuitry can readily process. However, if the pages are broadcast at different times and/or received at different times, the pagers will receive multiple, overlapping signals that cannot be processed. As a result, when a subscriber carries a pager into one of these signal overlap zones, it may become inoperative. In order to avoid this undesirable result, all of the paging stations should have clocks that indicate the same time so that each station transmits the same packet of pages at, the same time.

To date, it has proved difficult to economically provide a set of spaced-apart locations, such as paging stations, with clocks that are all in synchronization. Although individual stations can be provided with very accurate clocks, such as atomic clocks, these clocks are very expensive. Furthermore, it is typically necessary that the coordination of these clocks be performed by a technician that visits the clock site on an all too frequent basis. The expenses associated with having personnel make such visits often means that such coordination occurs at a less than optimal frequency.

Other attempts at providing a multiclock coordination system have involved providing a master unit that generates a continuous reference signal used by each of the geographically spaced apart clocks to regulate their rate. Typically, the reference signal is some type of periodic signal and the clocks employ phase-locked loop subcircuits to regulate the advancement of clocks. A disadvantage of these systems is that only clock rate information is broadcast from the reference. Another method, such as monitoring the output of the paging stations with one or more radio recievers, is required to periodically set the clocks relative to each other in order to allow simultaneous broadcast of pages. These systems tend to be complex, fault sensitive, and wasteful of the radio frequency upon which pages are broadcast.

SUMMARY OF THE INVENTION

This invention relates generally to a distributed transmission system, such as a paging system, that, by virtue of having coordinated components, can implement the simulcasting of signals. The system includes a system controller and a plurality of geographically distributed stations. The system controller and each of the stations include a clock. The stations are dependent upon timing information transmitted by the system controller in order to coordinate their respective clocks.

More particularly, the invention is directed to a transmission system wherein each clock is a binary counter that is advanced in response to a clocking signal generated by an oscillator. A system clock is locked onto an external reference time which, in one preferred embodiment of this invention, is a time signal transmitted by global positioning system (GPS) satellites. In one embodiment, the oscillator is voltage controlled and may be fine-tuned by a CPU in order to allow the system clock to maintain the correct time even if the time reference fails.

In the case of a paging system, the system controller transmits over a link system a timing mark that is integral with the paging data blocks (PDBs) normally transmitted over the link system. At a future time, the system clock transmits information over the link system indicating the absolute time at which the previous time mark was transmitted. Each of the clocks at the paging stations measures the time at which the time mark arrived, according to its clock. Further, each paging station has available the propagation delay time between the system controller and the paging station. By adding the propagation delay to the time at which the time mark was transmitted by the system controller, the paging station can determine the time at which the time mark should have been received. The difference between this time and the time at which the time mark actually was received is the error in the station's clock.

The present invention provides a convenient method to ensure that one or more clocks are running in parallel with a remote clock at the system controller. The individual clock units receive the time marks through the already established link system. Relatively few components are needed to provide the timing control circuit that controls the rate at which the counter advances. Thus, minimal site hardware and signal linkage component requirements make it relatively economical to provide this synchronization system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Overview of the Paging System

Figure 1:
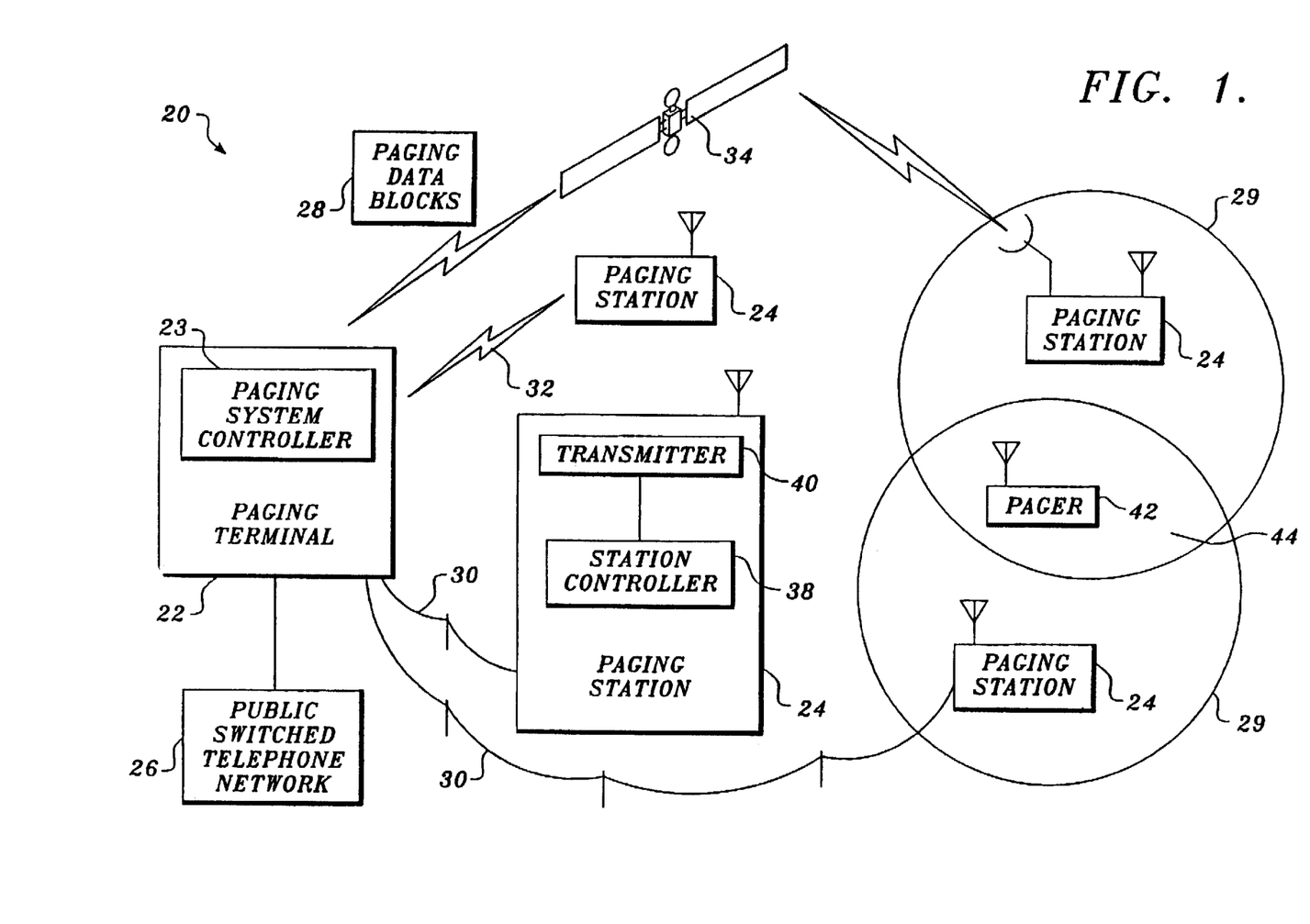
FIG. 1 is a block diagram of a paging system.

FIG. 1 illustrates a paging system 20 incorporating the method and apparatus of the present invention. Paging system 20 includes a paging terminal 22, a paging system controller 23, and a number of paging stations 24 that are spread over a wide geographic area. In this preferred embodiment of the present invention, the paging system controller 23 is integral with the paging terminal 22, as shown in FIG. 1. Alternatively, the paging system controller 23 may be distinct and separate from the paging terminal.

The paging terminal 22 is connected to a public switched telephone network (PSTN) 26 for receiving incoming telephone calls that comprise requests to page individuals who subscribe to the paging system 20. In response to the incoming calls, the paging terminal 22 creates pages that are transmitted by the paging terminal 22 to the paging system controller 23. The paging system controller 23 bundles the pages into paging data blocks (PDBs)28 that are forwarded to the paging stations 24. As will be described in more detail below, the PDBs contain different categories of information, including the actual paging data, forward error correction information, addressing information, and timing information. The paging stations 24, in turn, each broadcast the pages over a specific geographic area, as represented by circles 29 for the exemplary paging stations that are shown in FIG. 1.

The actual method by which PDBs 28 are forwarded to the paging stations 24 depends on such factors as the hardware of the paging stations, the distance to the paging stations, and/or the economics of employing specific forwarding systems. For example, PDBs 28 can be forwarded over a hard wire or fiber-optic telephone link 30. Other paging stations 24 are configured to receive the PDBs 28 over a microwave link 32, while still others receive them over a satellite link 34. Paging stations 24 may, of course, receive PDBs 28 over two or more alternative communication links. In the event one link fails, the others could be employed to ensure that the PDBs 28 are received.

Alternatively, the multiple links can be employed to simultaneously send multiple copies of each PDB 28 to the paging stations 24 to allow processing equipment at the individual stations to use the information from each of the PDBs to correct for any transmission errors. The links 30, 32, and 34 that are used to transmit the PDBs from the paging system controller 23 to each of the paging stations 24 in the system are collectively referred to as the link system.

Each paging station 24, one of which is shown in detail at the center of FIG. 1, contains a station controller 38 and a transmitter 40. The station controller 38 receives the PDBs 28 from the paging system controller 23 and converts the paging information contained therein into a format so that it can be modulated for broadcast by the transmitter 40.

The individual station controllers 38 control the transmission of the pages so that all the transmitters 40 broadcast the same page at exactly the same instant. This simulcasting ensures that when a pager receiver 42 is in an area where broadcasts from two or more paging terminals can be received, as represented by the overlapping area 44 between circles 29, the pager receiver receives a signal that can be readily processed. Thus, the station controllers 38 control the transmission of the pages contained in the PDBs 28 by the individual transmitters 40 so as to cause each transmitter to broadcast the pages contained within a single, common, PDB 28 at the same time.

The Paging System Controller

Figure 2:
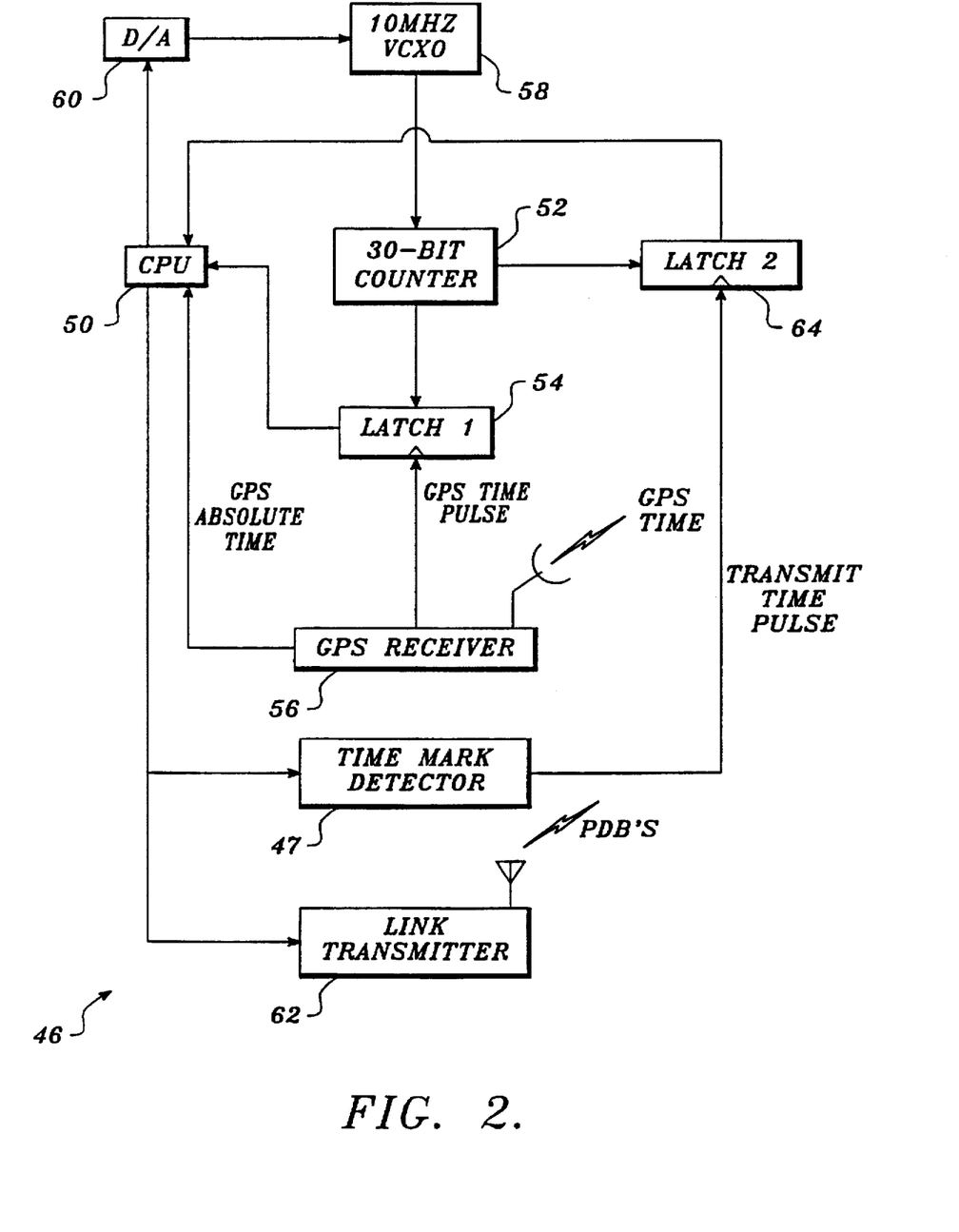
FIG. 2 is a block diagram of the clock in the system controller that is part of the paging system of this invention.

FIG. 2 illustrates in block diagram of a clock portion 46 of the paging system controller 23. The clock portion includes a CPU 50, a counter 52, a first latch 54, a second latch 64, a GPS receiver 56, a 10 MHz voltage controlled oscillator 58 (VCXO), a digital-to-analog converter (DAC) 60, a time mark detecting circuit 47, and a link transmitter 62. These components operate in a cooperative manner to synchronize the clock portion 46 with an external time reference and to transmit via link transmitter 62 timing information. In the preferred embodiment, the timing information is integral with the PDBs normally transmitted over the link system. As will be seen in greater detail below, the timing information (comprising a time mark and the absolute time at which the time mark was sent) is used by the station controller 38 of each paging station 24 to effectuate simulcasting of data.

The core components of the clock portion 46 are CPU 50, DAC 60, VCXO 58, and counter 52. The clock portion 46 operates by having VCXO 58 generate a clocking signal having a frequency of 10 MHz. A suitable VCXO 58 for producing this clocking signal is the Isotemp Research, Inc. Voltage-Controlled Oscillator, Model No. VCXO 134-10, which produces a variable-frequency output signal ranging between 9,999,988 and 10,000,012 Hz. The frequency of the output signal from the VCXO 58 is g function of the voltage applied to it by DAC 60.

Each time the VCXO generates one complete sinusoidal cycle of the clocking signal, the counter 52 advances one count. Optionally, a peak detector or other squaring circuit (not shown) may be interposed between the VCXO 58 and the counter 52 in order to convert the sinusoidal signal to a digital signal appropriate for driving counter 52.

The counter is a 30-bit binary counter set at modulo 600,000,000. Thus, the counter 58 advances in binary format until its count totals 599,999,999 and then resets to zero (0). Working in conjunction with a nominal 10 MHz signal from the VCXO 58, the counter will advance ten million counts each second. Because it is based on a modulo 600,000,000, the counter 52 will reset every sixty (60) seconds. Thus, each count of the counter 52 is nominally equivalent to an elapsed time of one-tenth of one microsecond (0.0000001 second). Moreover, the counter 52 may either be implemented in hardware, or alternatively, as software running on either CPU 50 or on a separate processor. As a further alternative, the counter may be implemented as a combination of hardware and software.

Moreover, counter modulos other than 600,000,000 and a VCXO having a frequency other than 10 MHz may be used. However, it is advantageous that the counter modulo divided by the frequency of the VCXO be a multiple of one minute or divide evenly into one minute. Thus, the precise implementation of the counter 52 is not critical and may be implemented in a variety of different manners.

As will be seen in greater detail below, the counter 52 maintains a measure of the number of tenths of microseconds (0.0000001 seconds) passing since it was last reset. If the time reference should temporarily or permanently fail, the counter value will drift relative to the start of a minute unless VCXO 58 is operating at exactly 10 MHz. For this reason, the VCXO 58 is regulated by a VCXO control signal generated by the CPU 50. In one preferred embodiment of the system, the CPU 50 generates a 16-bit VCXO control signal for establishing the frequency of the clocking signal generated by the VCXO 58. The VCXO control signal is transferred over a parallel data bus to DAC 60. The DAC 60 converts the digital VCXO control signal into an analog VCXO control signal that is applied to the VCXO 58.

Synchronization of the System Controller Clock to an External Time

The clock (which keeps the system time) of the system controller 23 is locked onto an external time reference, which in the preferred embodiment, is the GPS time reference. It can be appreciated that the external time reference may come from any source, including an atomic clock located at the system controller. In the preferred embodiment, GPS receiver 56 is used to receive a signal from one or more of the GPS satellites. These satellites generate highly accurate time and position signals and the satellites are arranged so that, at any point on the earth, a ground station, such as GPS receiver 56, can receive the signals from at least four satellites.

A suitable GPS receiver 56 is the "NavCore V" receiver available from the Rockwell Corporation of Dallas, Tex. GPS receivers of this type generally have two outputs: a pulse output (which in FIG. 2 is connected to first latch 54) and a serial data output (which in FIG. 2 is connected to CPU 50). Approximately once per second, the GPS receiver determines its precise location and the absolute time at that location. The GPS receiver then generates a narrow pulse (typically one microsecond and referred to herein as a GPS time pulse) on its pulse output and outputs its location and the absolute time, valid for when the GPS time pulse occurred, on its serial data output. The reference time from the GPS satellites is referred to herein as GPS absolute time. Further, since the system clock is locked to the GPS absolute time, the system time is equivalent to the GPS absolute time in the preferred embodiment. It should be noted that correction for the propagation time between the GPS satellites and the GPS receiver 56 is automatically provided by the GPS receiver 56. Thus, at the time the GPS receiver 56 outputs a GPS absolute time, that time is the correct GPS absolute time at the location of the GPS receiver.

Moreover, the apparatus shown in FIG. 2 will also operate with other GPS receivers in which the GPS time pulse is generated exactly on the absolute second and which only occasionally send the GPS absolute time on the serial data output. The CPU 50 can easily count the number of GPS time pulses since GPS absolute time was last received to determine the GPS absolute time of each GPS time pulse.

The CPU 50, which may be a Motorola 68302 32-bit microprocessor, along with associated memory circuits, is used to compare the time as maintained by the counter 52 with the GPS absolute time obtained from the GPS receiver. The method used by the present invention can best be understood by viewing both FIGS. 2 and 3.

Figure 3:
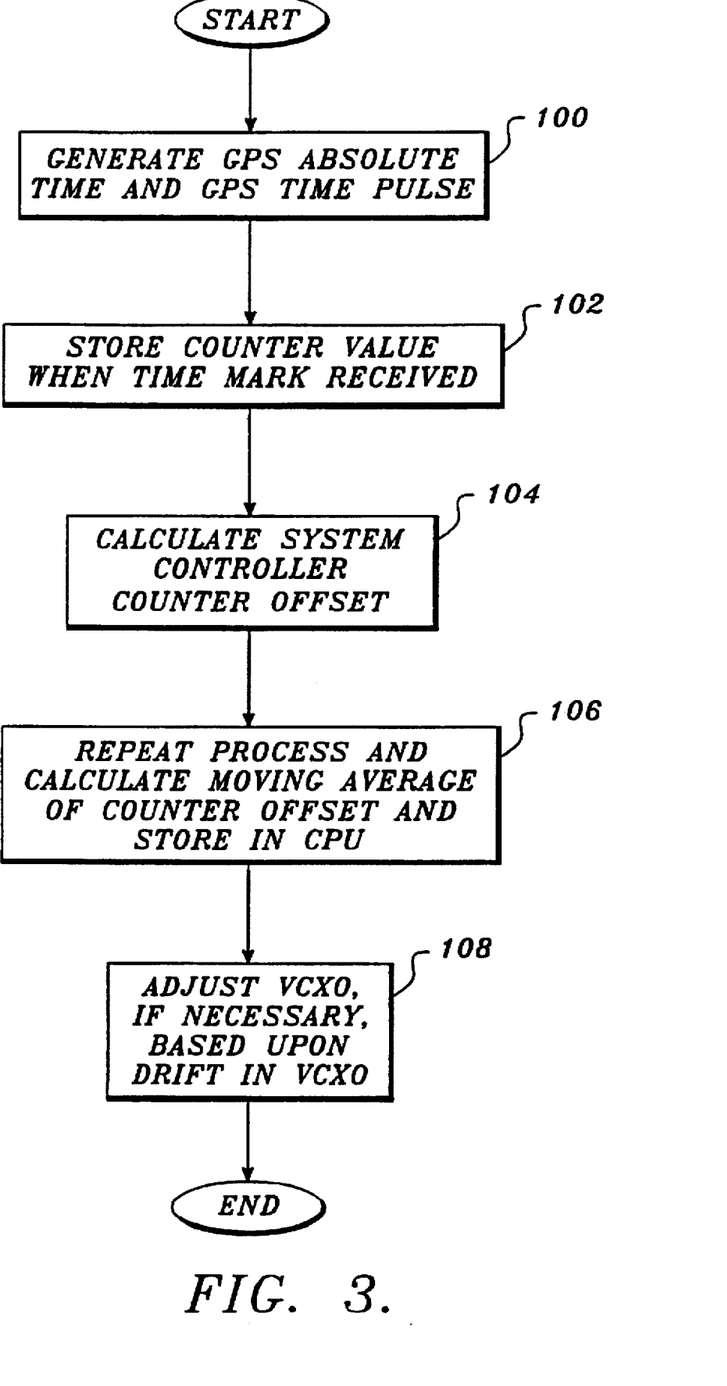
FIG. 3 is a flow diagram of the process by which the clock of the system controller is locked onto and synchronized to an external time reference.

In particular, synchronization of the system controller clock to GPS absolute time starts with the generation of the GPS time pulse and GPS absolute time information by the GPS receiver 56, as depicted in step 100. The GPS receiver 56 generates a GPS time pulse, which is input to latch 54. In turn, at step 102, latch 54 stores the value of counter 52 at the precise time the GPS time pulse is generated by the GPS receiver to allow reading by CPU 50 at any time before the next GPS time pulse. Additionally, the GPS absolute time as sent by the GPS receiver 56 is placed into a storage register in CPU 50.

When the system controller is initially powered up, the counter 52 is free running. Consequently, the counter 52 does not provide a recognizable indication of the GPS absolute time. For example, it is preferred that since the counter 52 "rolls over" every minute, the counter should read 000,000,000 when the paging system absolute time (as obtained from the GPS satellite) fails exactly on an even minute, e.g., 12:24:00.000. However, this condition rarely occurs and indeed, the probability of that occurrence is 600,000,000 to 1. Thus, at a step 104, a system controller counter offset must be determined in order for the counter 52 to be accurately used as a clock. First, the GPS absolute time and the counter value are placed into a format so that they can be readily compared to each other.

For example, the GPS absolute time is converted from a floating point representation into a fixed point number that is represented in binary format. Moreover, since the counter 52 only keeps track of the seconds portion of the GPS absolute time, for the purposes of determining counter offset, the hours and minutes portion of the GPS absolute time is discarded. Thus, the seconds portion of the GPS absolute time is converted into number of counts of tenths of microseconds from the beginning of the minute. For example, if the GPS absolute time were 12:34:04.123, then the decimal representation of the number of tenths of microseconds is 41,230,000.

The difference between the value of the counter 52 (also referred to herein as counter value) stored by first latch 54 and the value of the representation of the tenths of microseconds of the GPS absolute time is calculate. This difference indicates the amount by which the counter is offset from the GPS absolute time or the system controller counter offset.

To illustrate, assume that when GPS receiver 56 outputs a GPS time pulse, the GPS absolute time is 12:34:56.789 and that when latch 54 is activated by the GPS time pulse, the value of counter 52 is 282,820,000. Looking only at the seconds portion of the GPS absolute time and converting over to counter increments, the GPS absolute time is equivalent to 567,890,000 counter increments. Thus, by subtracting the 282,820,000 from 567,890,000, the system controller counter offset value is 285,070,000 counts. The counter offset value is important in determining the system time. For example, if at some future time, the counter value is 100,000,000, then the system time (equivalent to GPS absolute time in the preferred embodiment) is 38.507 seconds (100,000,000+285,070,000=385,070,000 counts) after the beginning of a minute.

The first calculated system controller counter offset when the system controller is initially powered up is stored in the CPU 50. However, as additional time marks and GPS timing information are received, the system controller counter offset is "fine tuned." Specifically, at step 106, the process of steps 100–104 is repeated for each GPS time mark that is received. A moving average of the system controller counter offset is then calculated in step 106, based on a predetermined number of system controller counter offsets; for example, the last 100 calculated system controller counter offsets. In the preferred embodiment, the moving average is calculated by means of a digital filter. Thus, the system controller counter offset is continually being fine tuned and stored in the CPU 50. It can be appreciated that if the VCXO 58 is operating at exactly 10 MHz, then the system controller counter offset should be substantially the same over a period of time.

Continued drift of the counter offset over several iterations of steps 100–104, indicates that the frequency of the VCXO 58 is not exactly 10 MHz. In such a case, at step 108, CPU 50 generates a VCXO control signal that is applied to DAC 60 and then to VCXO 58. The VCXO control signal tunes the VCXO such that the VCXO more accurately produces a 10 MHz signal. In particular, CPU 50 determines the extent to which the frequency of the output signal of VCXO 58 should be adjusted up or down. In situations in which the counter offset tends to drift upward, a VCXO control signal decreasing the frequency of the VCXO 58 is calculated. In cases in which the counter offset tends to drift downward, a VCXO control signal increasing the frequency of the VCXO 58 is calculated. The increase or decrease of the frequency of the VCXO 58 varies in inverse proportion with the drift in the counter offset.

One method of calculating the VCXO control signal involves first mathematically calculating a VCXO setting that would theoretically perfectly correct the counter offset drift, and then from that calculation, generating a new VCXO control signal that corrects for that drift. For example, assume that the counter offset has drifted upward 60 counts in one minute, which translates into a drift of one count every second. This drift indicates that the frequency of the VCXO 58 is 10,000,001 Hz, i.e., that the VCXO is slightly fast. The CPU 50 would then apply a VCXO control signal that will reduce the frequency of the VCXO 58 by 1 Hz.

Alternatively, an adaptive method may be used to calculate the VCXO control signal. The adaptive method initially measures the drift in the counter offset over a short period as in the method above. However, as the drift is reduced, the drift in the system controller counter offset is measured over a longer interval (tens of minutes). For example, when a time mark arrives, its system controller counter offset is compared to the system controller counter offset of a time mark received many minutes before (on the order of 30 minutes prior). The differences in the counter offsets are then averaged using a running average. This method provides a final VCXO control signal that is extremely accurate.

For example, suppose that at one minute past the hour, the counter offset was 43,500. At 31 minutes past the hour, the counter offset was 44,000. In other words, the offset has gained 50 microseconds (500 counter units) in 1800 seconds (30 minutes). The oscillator is thus too low in frequency, with a ratio of 1799.999950 divided by 1800.000000 which, when multiplied by 10 MHz, gives the actual VCXO frequency of 9,999,999.722 Hz. The VCXO then must be corrected for this discrepency. Thus, it should be understood that in the foregoing example, the adjustment is merely illustrative and other methods for correcting the drift or determining the VCXO control signal may be used.

The entire process described above and shown in FIG. 3 is repeated continually to ensure that the system controller 23 is synchronized to GPS absolute time and that the VCXO 58 is operating at 10 MHz.

Generation of the Time Mark Signals by the System Controller

After the system controller 23 has been locked to GPS absolute time, in accordance with the present invention, the system controller transmits over the link system timing information that is used by the paging stations to synchronize their respective clocks. The timing information comprises two parts and is transmitted via the link system, integral with the PDBs normally sent over the link system. Thus, the timing information requires minimal link transmission time and overhead.

Figure 5:
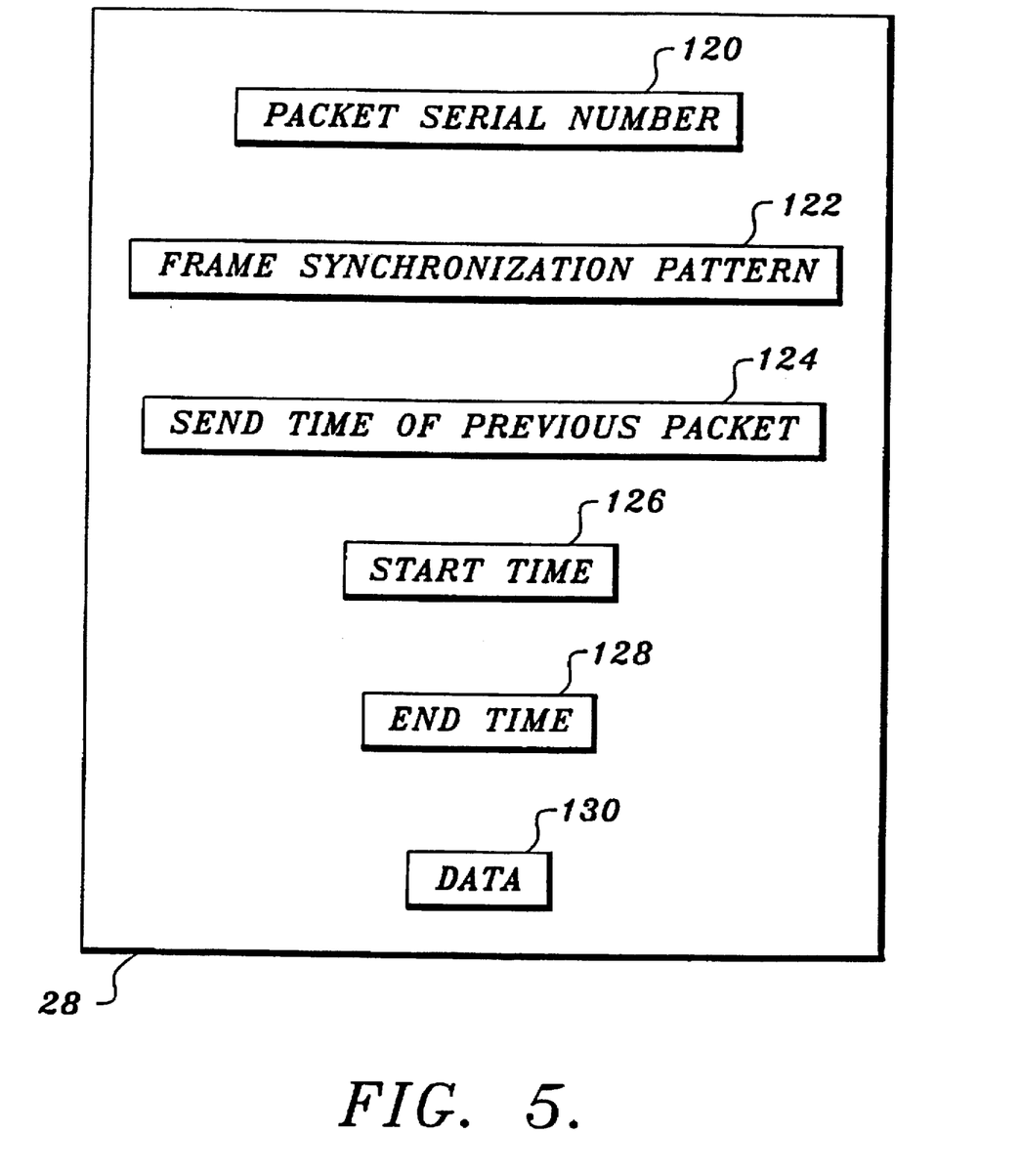
FIG. 5 is a representation of a typical paging data block (PDB) containing the time marks used for synchronization by the paging stations.

Referring now to FIG. 5, it will be evident that the PDBs contain multiple fields of information, including a packet serial number 120, a frame synchronization pattern 122, a send time of previous packet 124, a start time 126, an end time 128, and data 130. In an actual paging system, additional information is also bundled with the PDBs, however, that information is not germane to the present invention and need not be discussed herein. Moreover, the order in which the fields are shown in FIG. 5 may not represent the actual order in which the fields comprising the PDBs are sent over the link system. For example, the frame synchronization pattern is very often placed at the head of the data stream forming a PDB. Alternatively, the frame synchronization pattern may be interleaved throughout a portion of the PDB.

The packet serial number 120 identifies with particularity an individual PDB. The frame synchronization pattern 122 is provided to enable each paging station to capture the PDB. The frame synchronization pattern is a predetermined pattern with which the paging stations can recognize the boundaries of a PDB. The send time of previous packet 124 indicates the GPS absolute time when a time mark in a previous PDB was transmitted. Thus, the send time of previous packet field includes the GPS absolute time as well as the packet serial number of the previous PDB to which the GPS absolute time refers. The start time 126 and end time 128 indicate the GPS absolute time at which the paging station is commanded to start and stop the sending of data contained in the PDB. Finally, the data 130 are the actual pages that are transmitted by the paging stations.

The PDB format described above is merely illustrative and it can be appreciated by those skilled in the art that variations of the PDB format may be used. For example, the serial number of the PDB may be implied and the send time of previous packet field may refer to the Nth preceding packet, where N is any number agreed upon throughout the paging system. Furthermore, a start time and a duration of transmit may be used instead of a start time and an end time.

As stated above, the timing information contains two distinct parts: (1) a time mark within a PDB; and, (2) the send time of the time mark carried by a later PDB. The mechanics of placing the timing information into the PDB are best understood with reference to FIGS. 2 and 4. In particular, at step 150, when the next PDB is transmitted over the link system via the link transmitter 62, the PDB is provided to link transmitter 62 and time mark detector 47. The term time mark in the preferred embodiment does not refer to a discrete bit, signal or pulse. Rather, the time mark is a predetermined location in the PDB that is deemed to be the time mark. Specifically, in the preferred embodiment, the time mark is a predetermined number of bits following the frame synchronization pattern. The time mark in the preferred embodiment is a bit edge transition that is a predetermined amount of bits subsequent to the completion of the frame synchronization pattern.

Figure 4:
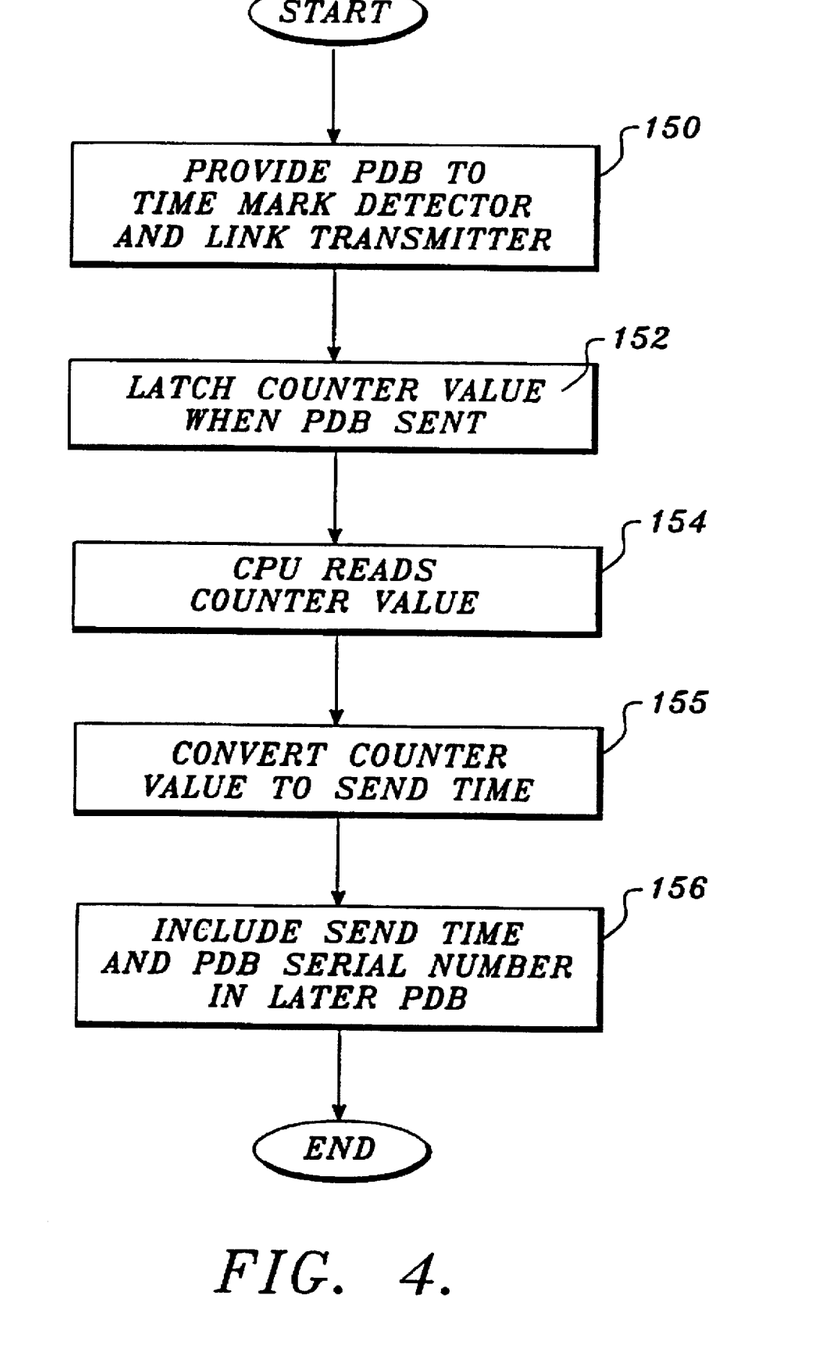
FIG. 4 is a flow diagram of the process by which the system controller transmits timing information over the link system in order to synchronize the paging stations.

Time mark detector 47 is operative to detect the frame synchronization pattern of the PDB and count a predetermined number of bits after the frame synchronization pattern. It can be appreciated that all of the components of the paging system are provided with the exact number of predetermined number of bits following the frame synchronization pattern. This allows all components to "look" at the same place for the time mark. In other words, this allows all components of the paging system to detect the time mark at the same bit transition. After the time mark detector 47 detects the time mark in the PDB, time mark detector 47 provides a transmit time pulse to second latch 64. Thus, at the instant the time mark in the PDB is transmitted by the system controller, the latch 64 at step 152 stores the value of counter 52 for use by CPU 50.

At step 154, the CPU 50 reads from latch 64 the counter value when the time mark of the PDB was transmitted. The CPU 50 also stores the serial number of the PDB. The CPU corrects the counter value by the system controller counter offset (discussed above) and determines the GPS absolute time at which the PDB was transmitted at step 155. Since in the preferred embodiment, the counter 52 resets each minute, the GPS absolute time is correlated to a value ranging from 0 to 599,999,999.

Finally, at a step 156, the GPS absolute time at which the time mark was transmitted, as well as the PDB serial number, are included in the field identifying the send time of previous packet 124, of a subsequently transmitted PDB. The process as shown in FIG. 4 is repeated continually by the paging system controller in order to synchronize the paging stations.

The foregoing is the preferred embodiment to providing the time mark integral with the PDBs. It can be appreciated that the time marks need not be integral with the PDBs. Instead, the time marks can be interleaved with the PDBs and the send time of previous time mark can also be interleaved. In other words, separate distinct packages of data may be used to transmit the timing information. However, the inclusion of the time mark, as described in the preferred embodiment, in the PDBs represents a savings of valuable link system air time.

The Station Controller

Figure 6:
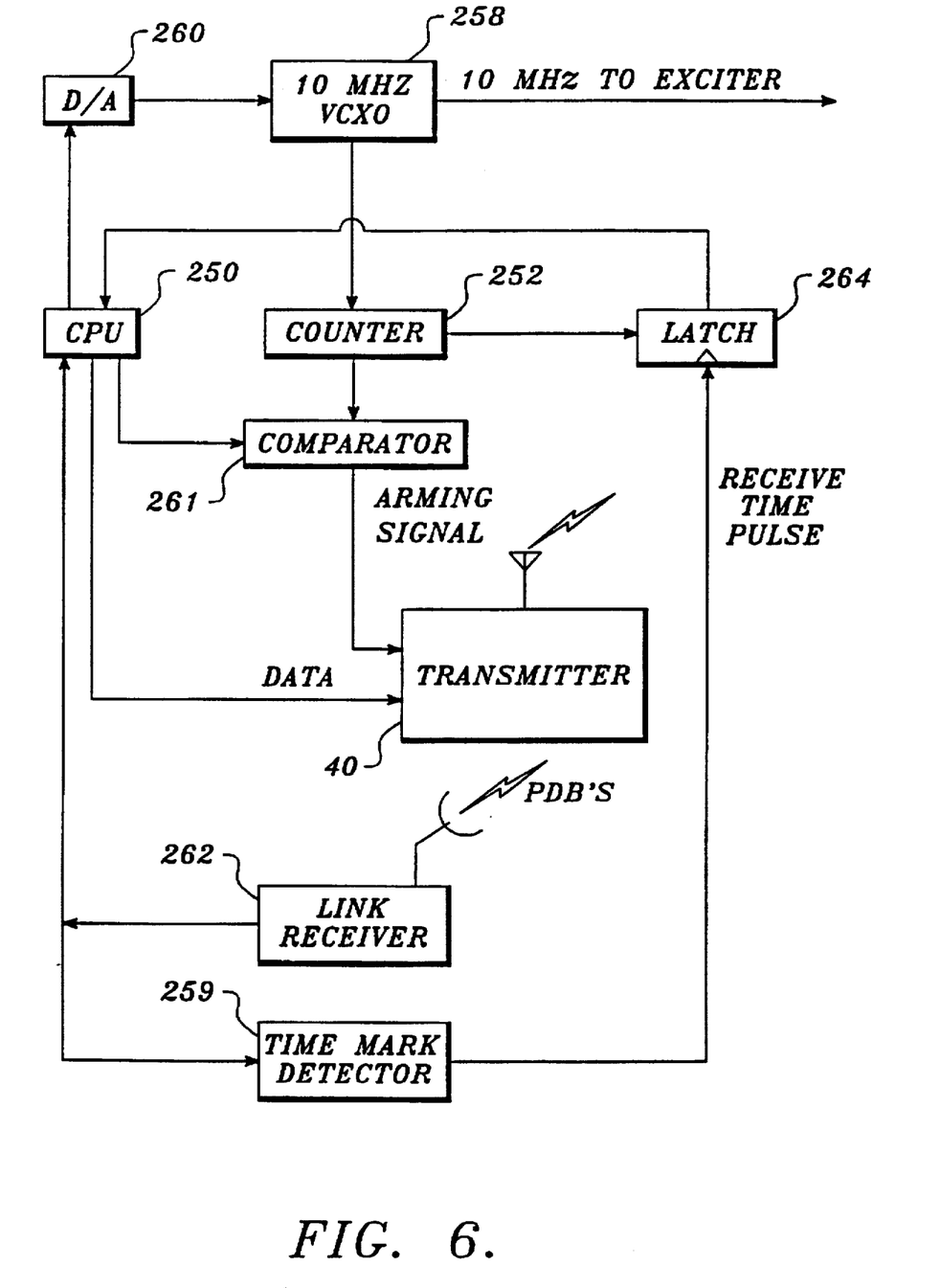
FIG. 6 is a block diagram of the station controller that is part of the system of this invention.

FIG. 6 illustrates in block diagram the germane components of station controller 38. As can be seen, the hardware of the clock of the station controller 38 is very similar to that of the system controller 23. As used herein, the term station time refers to the time as kept by the station controller 38.

The station controller includes a CPU 250, a counter 252, a latch 264, a 10 MHz VCXO 258, a DAC 260, a time mark detector 259, a comparator 261, and a link receiver 262. These components operate in a cooperative manner to coordinate the clock with the system clock using the timing information received over the link system.

The core components of the clock are CPU 252, DAC 260, VCXO 258, and counter 252. Like the VCXO of the system controller, VCXO 258 generates and provides a signal that is nominally set to a frequency of 10 MHz. The VCXO 258 may or may not be of the same type as that used in the system controller. However, like the VCXO in the system controller, the frequency of the output signal from the VCXO 258 is a function of its applied voltage. Each time the signal output by the VCXO 258 runs through a complete sinusoidal cycle, a clocking signal is produced that causes the count on counter 252 to advance one increment.

The counter is a 30-bit binary counter set at modulo 600,000,000. Thus, the counter 258 advances in binary format until its count totals 599,999,999 and then resets to zero (0). Working in conjunction with a nominal 10 MHz signal from the VCXO 258, the counter will nominally advance ten million counts each second. Because it is based on a modulo 600,000,000, the counter 252 will reset every sixty (60) seconds. Thus, each count of the counter 252 is nominally equivalent to an elapsed time of one-tenth of one microsecond (0.0000001 second). Like the counter in the system controller, the counter 252 may be implemented as hardware, software, or a combination of both.

If the link system should temporarily fail, stopping the reception of time marks, the counter value will drift relative to the start of a minute unless VCXO 258 is operating at exactly 10 MHz. Because of this drift, the VCXO 258 is regulated by a set of VCXO control signals generated by the CPU 250. In one preferred embodiment of the system, the CPU 250 generates a 16-bit VCXO control signal for establishing the frequency of the signal generated by the VCXO 258. The VCXO control signal is transferred over a parallel data bus to DAC 260. The DAC 260 converts the digital VCXO control signal into a analog VCXO control signal that is applied to the VCXO 258.

In the case of the station controller 38, as seen in FIG. 6, the output of the VCXO 258 may also be supplied to the paging station transmitter 40. The paging station transmitter 40 uses the VCXO output signal as a reference signal to regulate the frequency of the carrier signal that it produces. For example, transmitter 40 preferably includes a phase-locked loop synthesizer that generates a signal, which forms the basis for the carrier signal. The VCXO 258 output signal is supplied to the phase-locked loop synthesizer to regulate the frequency of the carrier signal.

Further, the comparator 261 and transmitter 40 operate in conjunction with the other components of station controller 38 to transmit the actual pages from the paging station to the pagers. Recall that each PDB includes data, start time of transmit, and end time of transmit. Each individual bit of the data (the actual pages broadcast by the paging stations) must be broadcast at the appropriate time. That is the responsibility of the CPU250, the comparator 261, and the transmitter 40.

In particular, the CPU 250 provides a specific counter value to comparator 261 that indicates when the next bit of data of the PDB should be transmitted. The CPU 252, by a separate line as shown in FIG. 6, also provides the bit data to transmitter 40. Comparator 261 also monitors the value of counter 252. When the value of counter 252 is equivalent to the specific counter value from the CPU 250, comparator 261 outputs an arming signal to the transmitter 40. At that time transmitter 40 accepts the bit to be transmitted from CPU 250 and transmits that bit. Alternatively, the output of comparator 261 may operate a latch to change the state of one or more output bits at the desired time. The particular counter values output by CPU 250 to the comparator 261 for each bit of the data from the PDBs is calculated by the CPU 250. One method of accomplishing this calculation is by subtracting the start time of transmit from the end time of transmit to determine a duration of transmit. Further, it is known how many bits of data must be transmitted in that duration. Thus, the start times for each bit of the data can be calculated by dividing the duration of transmit by the number of bits and incrementing the transmit time by that value, accounting for error due to a fractional remainder by occasionally increasing the transmit time by one count.

For example, assume that the start time is 12:00:00.000, the end time is 12:00:01.000, and the number of bits to be transmitted is equal to 1000. Next, assume also that the counter 252 reads 000,000,000 when the GPS absolute time falls exactly on an even minute. Thus, CPU 250 will provide the value 000,000,000 to comparator 261 for transmittal of the first bit; the value of 000,010,000 for transmittal of the second bit; the value of 000,020,000 for transmittal of the third bit, etc . . . Each subsequent bit is transmitted at increments of 10,000 counts.

The Use of the Timing Information by the Station Controller

Figure 7:
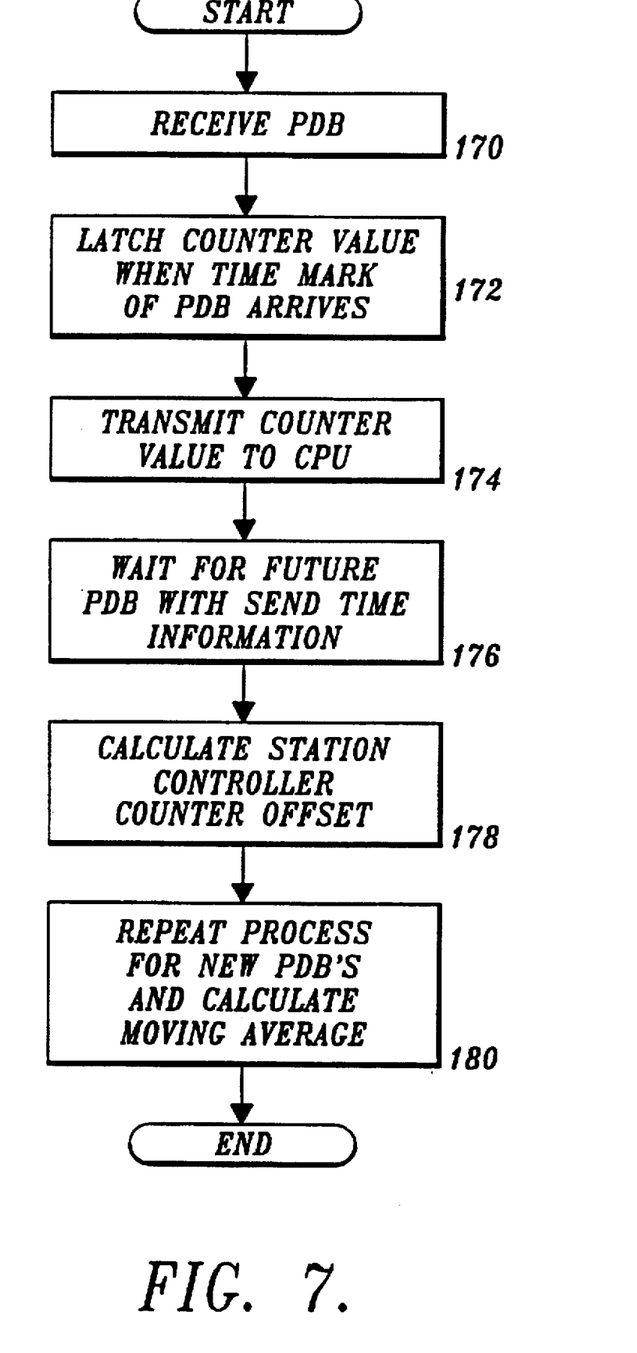
FIG. 7 is a flow diagram of the process by which the station controller uses the timing information received over the link system in order to maintain coordination of its clock.

The description of how the station controllers 38 utilize the timing information is presented with reference to FIG. 7. First at a step 170, the PDB transmitted over the link system is received by the link receiver 262. Next, at step 172, when the PDB arrives, it is provided to time mark detector 259 as well as CPU 250. Time mark detector 259 is substantially similar to the time mark detector 47 in the system controller (shown in FIG. 3). The time mark detector upon detection of the time mark embedded in the PDB generates a receive time pulse which activates latch 264. Thus, the precise station time at which the PDB arrives at the link receiver 262 is stored in latch 264 for reading and use by CPU 250. Next, at step 174, the counter value is read by CPU 250 and, at step 176, the station controller 38 waits for the subsequent PDB to arrive which indicates when the previous time mark was sent in terms of GPS absolute time.

The first time a PDB is received, an initial station controller counter offset is calculated at step 178. The calculation is similar to that done for the system controller counter offset. For example, assume that the station controller is initially powered up and the counter 252 is free running. Next, assume that a PDB arrives over the link system having a serial number 53 and upon arrival, the time mark detector 259 generates a receive time pulse that latches a counter value of 200,000,000. At a later time, a PDB arrives at the station controller indicating that PDB serial number 53 was sent at 12:34:56.000 GPS absolute time. Moreover, the propagation time over the link system is known (using methods described further below) to be 1.0 seconds. Thus, the CPU 250 of station controller can calculate that the PDB should have been received at an absolute time of 12:34:57.000. That is, the local counter was 200,000,000 when the absolute time, converted to counts, was 570,000, 000. Using the same method for calculating the system controller used in the system controller 23, the station controller determines that the counter is lagging behind GPS absolute time by 370,000,000 counts (tenths of microseconds). Thus, in this case, the station controller counter offset is 370,000,000 counts.

Once the station controller counter offset has been calculated from first PDB, the CPU 250 of the station controller can now determine the appropriate counter value that corresponds to any GPS absolute time. To illustrate, taking the example above, if in the future, it is desired to know the counter value when the GPS absolute time reads 12:00:47.000, then the station counter offset of 370,000,000 is subtracted from 470,000,000 to give a value of 100,000, 000. Thus, when counter value is 100,000,000, the CPU 250 can determine that the GPS absolute time is 47.000 seconds after the beginning of a minute.

This ability to correspond counter values at the station controller to GPS absolute time is an important part of the present invention. Recall that each PDB includes a start time of transmit that is set forth as a GPS absolute time. Returning to the example above, if the PDB has a start time of 12:00:45.678, then the counter value at the beginning of transmission should be 456,780,000 (the seconds portion of GPS absolute time converted to tenths of microseconds) minus 370,000,000 (the calculated station controller counter offset), which equals 86,780,000. Thus, when the counter 252 reads 86,780,000, the station controller should commence transmission, i.e., the value presented to comparator 261.

Each time a new PDB is received, steps 170–178 are repeated to calculate a new station controller counter offset. As additional PDBs arrive, the station controller counter offset is "fine tuned." Specifically, at step 180, the process of steps 170–178 is repeated for each GPS time mark that is received. A moving average of the station controller counter offset is then calculated in step 180, based on a predetermined number of station controller counter offsets; for example, the last 100 calculated station controller counter offsets. In the preferred embodiment, the moving average is calculated by means of a digital filter. Thus, the station controller counter offset is continually being fine tuned and stored in the CPU 250. It can be appreciated that if the VCXO 258 is operating at exactly 10 MHz, then the station controller counter offset should be substantially the same over a period of time.

Continued drift of the counter offset over several iterations of steps 170–178, indicates that the frequency of the VCXO 258 is not exactly 10 MHz. In such a case, at step 180, CPU 250 generates a VCXO control signal that is applied to DAC 260 and then to VCXO 258. The VCXO control signal tunes the VCXO such that the VCXO more accurately produces a 10 MHz. signal. In particular, CPU 250 determines the extent to which the frequency of the output signal of VCXO 258 should be adjusted up or down. In situations in which the counter offset tends to drift upward, a VCXO control signal decreasing the frequency of the VCXO 258 is calculated. In cases in which the station controller counter offset tends to drift downward, a VCXO control signal increasing the frequency of the VCXO 258 is calculated. The increase or decrease of the frequency of the VCXO 258 varies in inverse proportion with the drift in the counter offset.

The methods of adjusting the VCXO in the station controller is substantially similar to that method used in adjusting the VCXO in the system controller and will not be repeated here.

As noted above, including the clock at all of the station controllers 38 to the system controller 23 is important with regard to simulcasting. In a paging system where the PDBs contain information instructing the paging stations exactly when (to the nearest tenth of a microsecond) to broadcast the pages, each paging station must have an accurate clock.

Methods of Calculating Link Delay to Each Paging Station

As noted above, knowledge of the amount of link delay (the propagation time of the PDB from the system controller to the paging station) for each paging station is important in achieving simulcasting. The link delay can be determined by at least four separate methods.

First, the link delay normally may be determined by geometrical considerations, i.e., measuring the distance from the system controller to the paging station and dividing by the speed of propagation of electromagnetic waves. This method is most useful for radio links where the distance of propagation is fixed. However, for satellite links, where the orbit of the satellite varies, the propagation distance between the system controller and the paging station will vary. In this case, the third method described below is appropriate.

Second, a single mobile GPS receiver can be used to determine the link propagation delay (denoted as PD) between the system controller and each individual paging station. In particular, the mobile GPS receiver is brought to the paging station. The output of the GPS receiver is provided to the station controller of the paging station, using the embodiment shown in FIG. 10.

The GPS absolute time at which a PDB is received at a paging station is equal to the GPS absolute time at which the PDB was transmitted plus the propagation delay over the link. Therefore, the PD=Time of Receive—Time of Transmit. As noted above, the Time of Transmit is included in a subsequent PDB that is transmitted over the link delay. Thus, the GPS absolute time at receipt must be determined to calculate propagation delay. This is calculated as follows: when the mobile GPS receiver at the station controller provides a GPS time pulse, the counter value of the station controller is noted as well as the GPS absolute time at that counter value. From this information, the counter value When the PDB arrived can be correlated back to a GPS absolute time (when the PDB arrived at the station controller).

To illustrate, assume that the time mark from the PDB arrives when the counter value is 100,000,000 and the corresponding GPS absolute time when that time mark was sent is 12:00:00.000. Next, assume that the GPS receiver provides a GPS time pulse to the station controller when the counter value is 105,000,000 with a GPS absolute time at 12:00:00.600. The counter value has progressed 5,000,000 counts (or 0.5 seconds) between the time when the time mark (the PDB) arrived and the time the GPS time pulse arrived. This indicates that when the counter value read 100,000,000 (when the PDB was received), the GPS absolute time was 12:00:00.100. Using the formula given above, the propagation delay is equivalent to 0.1 seconds.

Figure 8A:
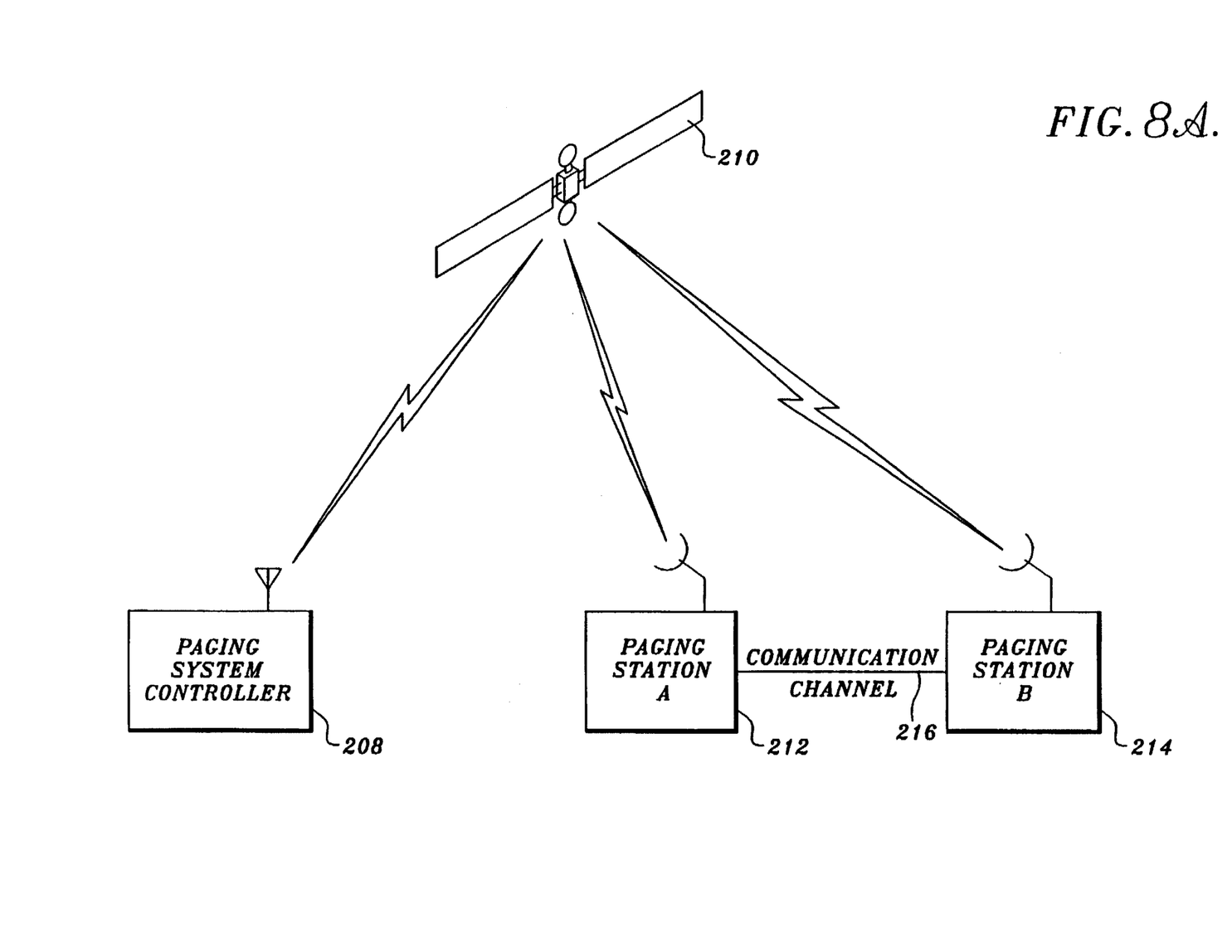
FIG. 8A is a diagram illustrating a paging system using a satellite link and configured to determine propagation link delay.

Third, where the link system includes a satellite link, a more complex variation on the above method must be used. Because the satellite varies in orbit, the propagation over the delay varies with time. Thus, it is important to measure the propagation delay for all of the paging stations at substantially the same time. The second method described above can be utilized, however, it would require a technician at each paging station at the same time. The present third method requires the use of two GPS receivers, one of which is used as a benchmark. Turning to FIG. 8, a simplified two paging station paging system using a satellite link is shown. A system controller 208 transmits PDBs to satellite 210, which in turn transmits the PDBs to paging station A 212 and paging station B 214. Additionally, a communication channel 216 between the two paging stations is provided.

Figure 8B:
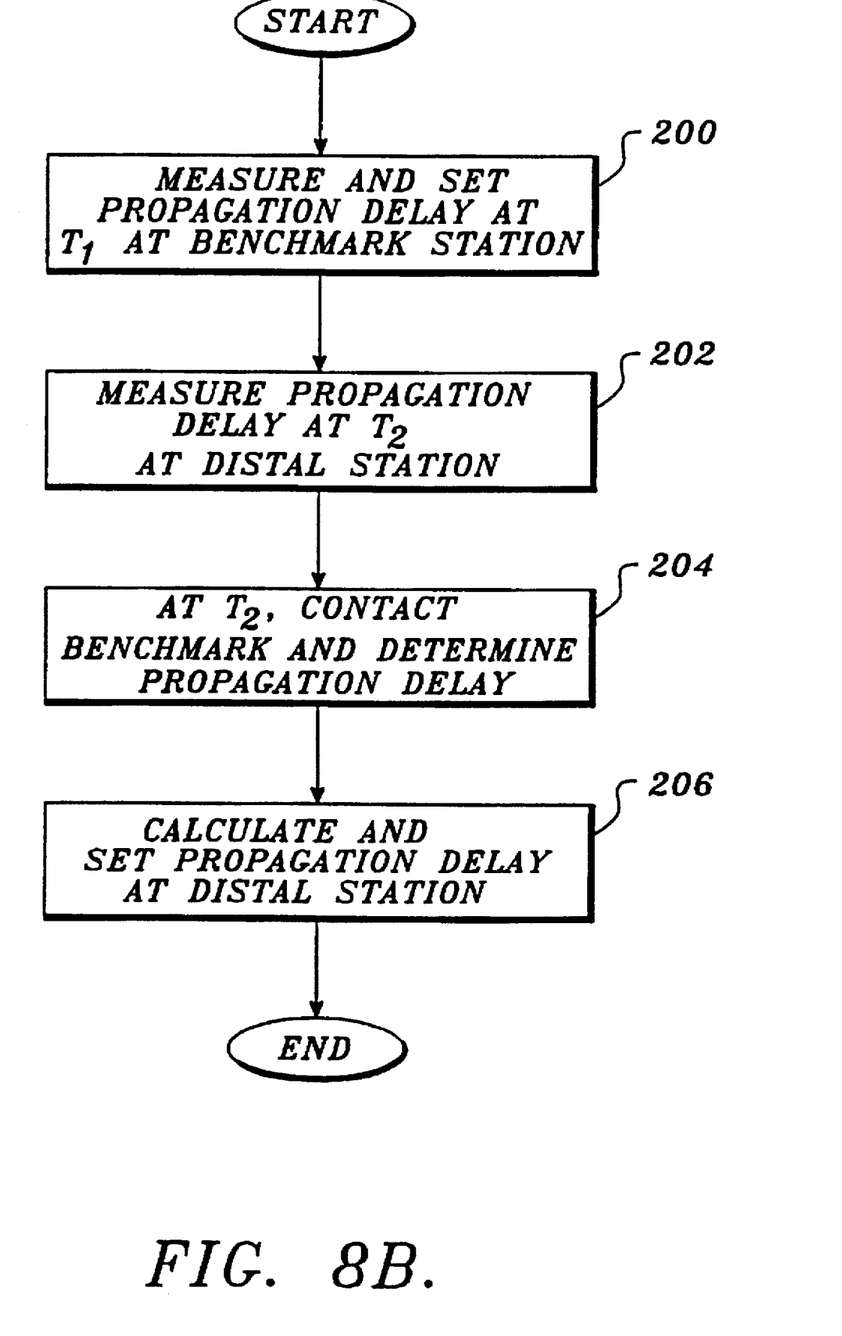
FIG. 8B is a flow diagram illustrating a method for determining link delay over a satellite link.

The method can be seen in FIG. 8B where at step 200, a first GPS receiver is brought to a benchmark paging station, in this case paging station A 212. Using the method described above, at a time $T_1$, the propagation link delay is measured for the paging station A 212, denoted as $AD_1$. Further, this propagation delay is stored in the CPU of paging station A 212 for use by the station controller in calculating its station controller counter offset. In order to coordinate the paging stations, it is necessary to determine the propagation delay for paging station B 214, at time $T_1$, denoted as $BD_1$.

Next, at a step 202, leaving the first GPS receiver at paging station A 212, a second GPS receiver is brought to paging station B 214 and the propagation delay at a time $T_2$ is measured as $BD_2$. Next, at step 204, at substantially time $T_2$, the technician at paging station B 214 uses communication channel 216 to contact paging station A 212 to determine its propagation delay at time $T_2$ as denoted as $AD_2$. It has been determined that the propagation delay based upon the movement of the satellite 210 within its orbit will vary nearly the same for each paging station. Thus, the difference in propagation delays for two separate paging stations at two separate times should be equivalent. In other words $BD_2-BD_1=AD_2-AD_1$ or $BD_1=BD_2-AD_2+AD_1$. Thus, the propagation delay at paging station B 214 is then set at step 206 as equal to $BD_2-AD_2+AD_1$. The foregoing process can be done for each paging station in the paging system with each of the paging stations referring back to the benchmark station.

Figure 9:
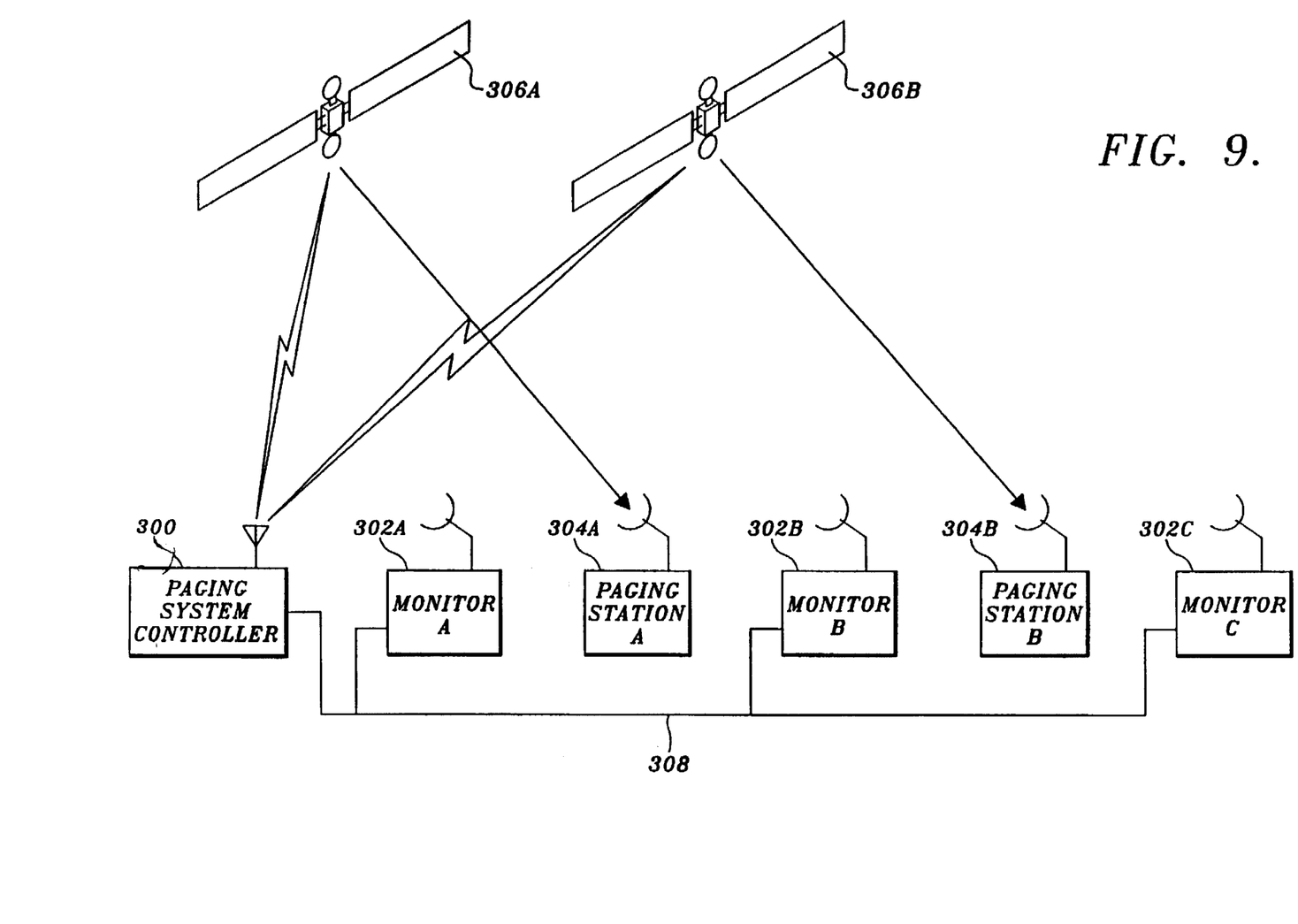
FIG. 9 is a diagram illustrating a paging system using a redundant satellite link and configured to determine propagation link delay.

Fourth, where the link system includes more than one satellite links, an automatic method of link delay measurement must be made. The measurement of link delay is automatic and continuous thereby reducing the need to visit the various paging stations. Moreover, the fourth method allows the propagation delay to be updated at relatively short intervals, thereby allowing adaptation to changing link system characteristics. Referring to FIG. 9, a redundant satellite link paging system is shown. The system comprises a system controller 300, two satellites 306A and 306B, three monitor stations 302A, 302B, and 302C, two paging stations 304A and 304B, and a communications channel 308.

The monitor stations 302A–C are interspersed at various locations throughout the paging system. In the case of a nationwide paging system, several monitor stations may be required located at geographically spaced apart locations in the country. Each of the monitor stations 302A–C is capable of receiving PDBs transmitted by either of the satellites 306A–B. The monitor stations 302A–C also include a GPS receiver. Using the second method described above, the monitor stations 302A–C can constantly calculate the propagation delay over each of the satellites at any particular time. Each of the monitor stations 302A–C report back to the system controller, via communications channel 308, the propagation delay at their locale for each of the satellites. The communications channel may be a telephone line, packet data network, or other type of channel.

The system controller 300 upon receipt of the information from the monitor stations 302A–C sends the information over the satellite to which the information applies to each of the paging stations. The paging stations can then calculate the propagation delay over either satellite link by interpolation and/or averaging the propagation delays measured by each monitor station 302A–C for the link.

For example, as depicted in FIG. 9, paging station 304A is between monitor stations 302A and 302B. The propagation delay using satellite 306A will be a weighted average of the propagation delays for satellite 306A as monitored by monitor station 302A and monitor station 302B. The precise weighting of each of the readings from the monitor stations 304A–C for any particular paging station is dependent upon the geographic location of the monitor stations and the paging station. One important advantage of this method is that if a paging station switches to another satellite link, recalculation of the propagation delay is straightforward and without need of a visit from a technician. The paging station just recalculates its weighted average of readings from the monitor stations 302 for the new satellite.

Alternative Embodiment of the Station Controller

The method described above, which is based upon transmission of timing information over the link system, is highly suited to paging systems that have a high percentage of satellite or RF links. In the case of satellite or RF, the propagation time between the system controller and each of the individual station controllers can be easily calculated or measured. However, in the case of a link system including a large number of telephone lines or other hard-wired communications channels, the propagation delay may vary considerably. For example, for public telephone lines, variable routing of phone transmissions by the telephone company may drastically alter the propagation time of the PDBs. Further, changes in ambient temperature may vary the propagation delay.

Figure 10:
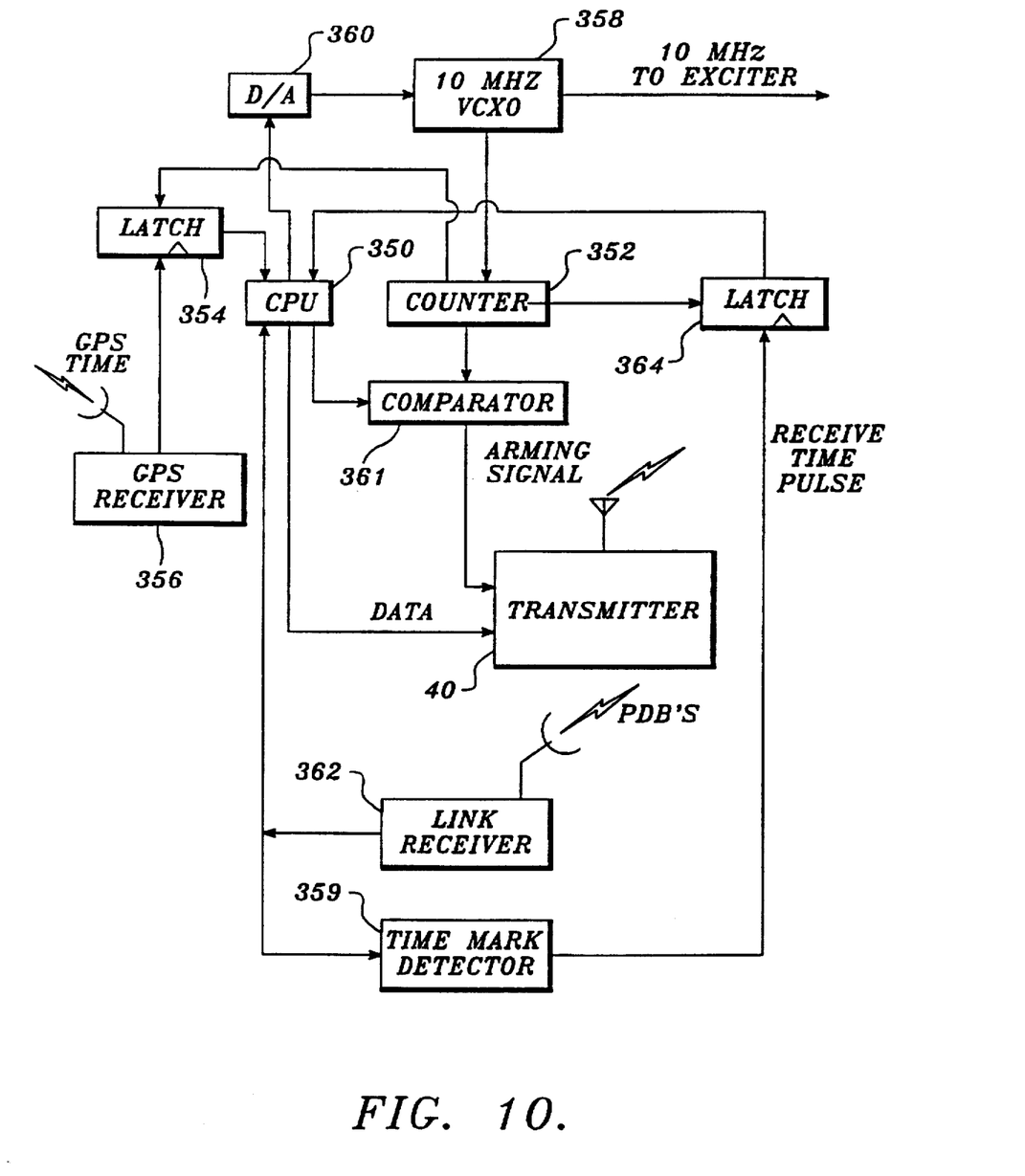
FIG. 10 is a block diagram of alternative embodiment of the clock in the station controller.

In these situations, the transmission of timing information over the link channel may not be as effective as when the link system is a satellite or RF link. To solve this difficulty, in an alternative embodiment of the present invention, each of the station controllers of each of the paging stations includes a GPS receiver. Specifically, as seen in FIG. 10, the alternative embodiment is substantially similar to the preferred embodiment of the station controller. However, a GPS receiver 356 and a latch 354 have been added to allow the alternative embodiment of the station controller correlate its clock directly to GPS absolute time.

The clock at each station controller locks onto the signals from a GPS satellite and performs a synchronization process that is identical to that described above for the system controller with reference to FIG. 3. In such a manner, each paging station is independently capable of synchronizing its internal clock to that of the GPS satellites. By having all of the individual clocks synchronized, all paging stations will be able to transmit the paging signals simultaneously. This embodiment may be used to measure the propagation delay over the link as well (as previously described).

The foregoing detailed description has been limited to specific embodiments of the invention. It will be apparent, however, that variations and modifications can be made to this invention with the attainment of some or all of the advantages thereof. Therefore, it is the object of the appended claims to cover all such variations as come within the true spirit and scope of the invention.

The embodiments of the invention in which an exclusive property or privilege is claimed are defined as follows:

1. A method of determining a coordinated propagation delay of a signal between a system controller and a plurality of paging stations, said signal being transmitted over a satellite link, said plurality of paging stations including a benchmark paging station and at least one other paging station, said method comprising the steps of:

measuring a propagation delay at a first time for the signal propagating between the system controller and said benchmark station;

measuring the propagation delay at a second time for the signal propagating between the system controller and said one other paging station;

measuring the propagation delay at said second time for the signal propagating between the system controller and said benchmark station; and setting said coordinated propagation delay for said one other paging station as the propagation delay of said one other paging station at said second time less the difference in propagation delays for said benchmark station at said second time and said first time.

* * * * *